(12) United States Patent
Jaffari et al.

(10) Patent No.: US 9,564,744 B2
(45) Date of Patent: Feb. 7, 2017

(54) ADJUSTABLE BRACKET ASSEMBLY

(71) Applicant: Thomas & Betts International, Inc., Wilmington, DE (US)

(72) Inventors: Andy A. Jaffari, Bartlett, TN (US); Robert H. Osborn, Somerville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 14/309,564

(22) Filed: Jun. 19, 2014

(65) Prior Publication Data

US 2015/0001357 A1  Jan. 1, 2015

Related U.S. Application Data

(60) Provisional application No. 61/840,123, filed on Jun. 27, 2013.

(51) Int. Cl.
*H02G 3/00* (2006.01)
*H02G 3/12* (2006.01)

(52) U.S. Cl.
CPC .................................. *H02G 3/128* (2013.01)

(58) Field of Classification Search
CPC ............ H02G 3/128; H02G 3/10; H02G 3/12; H02G 3/121; H02G 3/126; H02G 3/125; H02G 3/123; F16M 13/00; H05K 5/0204
USPC .... 248/201, 295.11, 298.1, 906, 200.1, 300; 174/58, 50, 57
See application file for complete search history.

(56) References Cited

U.S. PATENT DOCUMENTS

| | | | |
|---|---|---|---|
| 1,288,024 A * | 12/1918 | Kendig | H02G 3/125 220/3.9 |
| 2,023,083 A | 10/1930 | Knell | |
| 3,163,386 A | 12/1964 | Collins | |
| 4,165,851 A | 8/1979 | Bowden, Jr. et al. | |
| 5,114,105 A | 5/1992 | Young | |
| 5,209,444 A * | 5/1993 | Rinderer | H02G 3/126 248/205.1 |
| 5,303,894 A | 4/1994 | Deschamps et al. | |
| 5,330,137 A | 7/1994 | Oliva | |
| 5,386,959 A | 2/1995 | Laughlin et al. | |
| 5,505,419 A * | 4/1996 | Gabrius | F21V 21/04 248/200.1 |
| 5,678,799 A | 10/1997 | Jorgensen et al. | |
| 5,934,631 A | 8/1999 | Becker et al. | |
| 5,954,304 A | 9/1999 | Jorgensen | |
| 6,076,788 A * | 6/2000 | Akiyama | E04B 9/006 248/200.1 |
| 6,484,979 B1 | 11/2002 | Medlin, Jr. | |

(Continued)

FOREIGN PATENT DOCUMENTS

WO  2013/056351 A1  4/2013

OTHER PUBLICATIONS

"TSRBS1625 Telescoping Box Mount for Single and Multiple Gang Boxes." ERICO International Corporation, 2009.

*Primary Examiner* — Anita M King
(74) *Attorney, Agent, or Firm* — Taft Stettinius & Hollister LLP

(57) ABSTRACT

An adjustable bracket may include a first hermaphroditic piece and a second hermaphroditic piece, substantially identical to the first hermaphroditic piece and rotated 180 degrees with respect to the first hermaphroditic piece, wherein sliding the first hermaphroditic piece with respect to the second hermaphroditic piece adjusts a width of the adjustable bracket.

11 Claims, 12 Drawing Sheets

(56) References Cited

U.S. PATENT DOCUMENTS

| | | |
|---|---|---|
| 6,519,791 B2 | 2/2003 | Randolph |
| 6,666,419 B1 | 12/2003 | Vrame |
| 6,803,521 B2 | 10/2004 | Vrame |
| 6,889,943 B2 | 5/2005 | Dinh et al. |
| 6,967,284 B1 | 11/2005 | Gretz |
| 7,036,782 B2 | 5/2006 | Cheatham et al. |
| 7,040,586 B2 | 5/2006 | Kusber et al. |
| 7,216,838 B1 | 5/2007 | Gretz |
| 7,355,118 B1 | 4/2008 | Gretz |
| 7,654,495 B2 | 2/2010 | Adrian et al. |
| 7,854,275 B2 | 12/2010 | Mock et al. |
| 8,215,597 B1 | 7/2012 | Medlin, Sr. et al. |
| 2005/0001123 A1* | 1/2005 | Cheatham .............. H02G 3/125 248/298.1 |
| 2010/0270446 A1 | 10/2010 | Phillips |

* cited by examiner

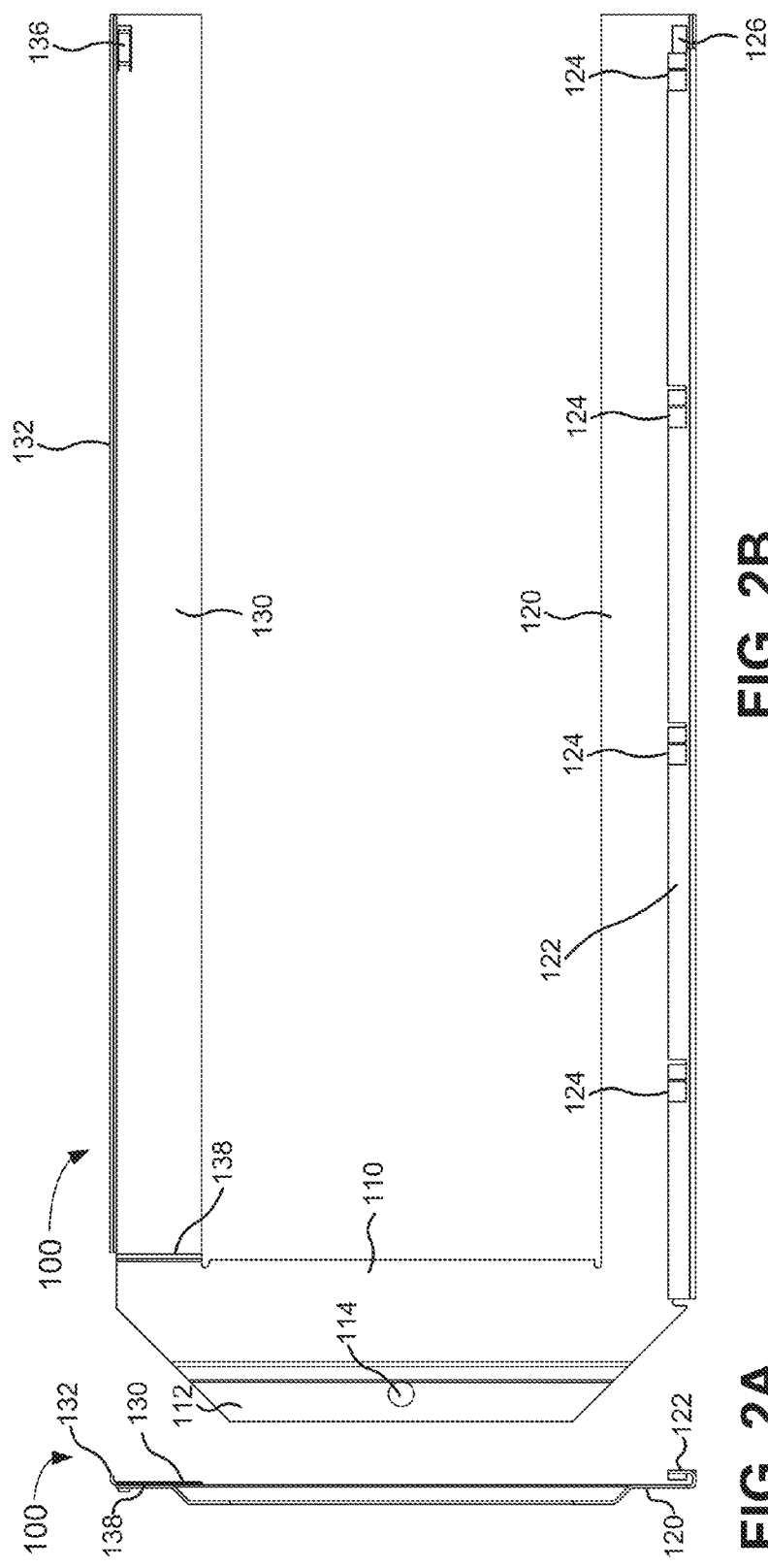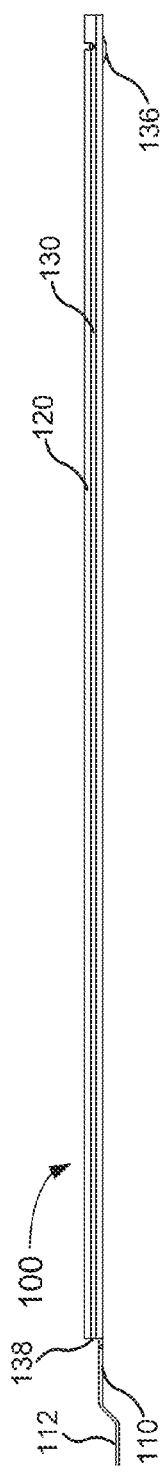

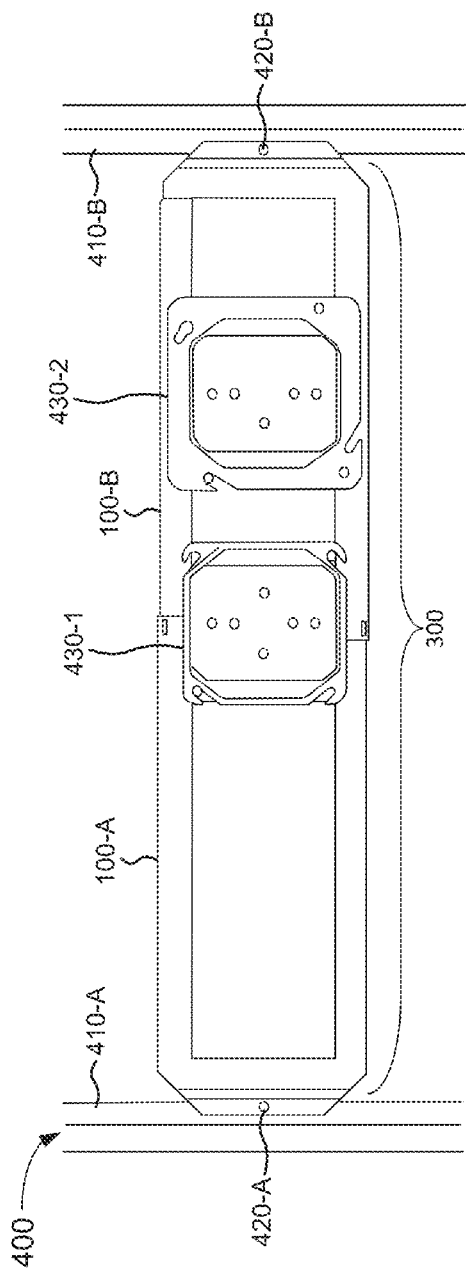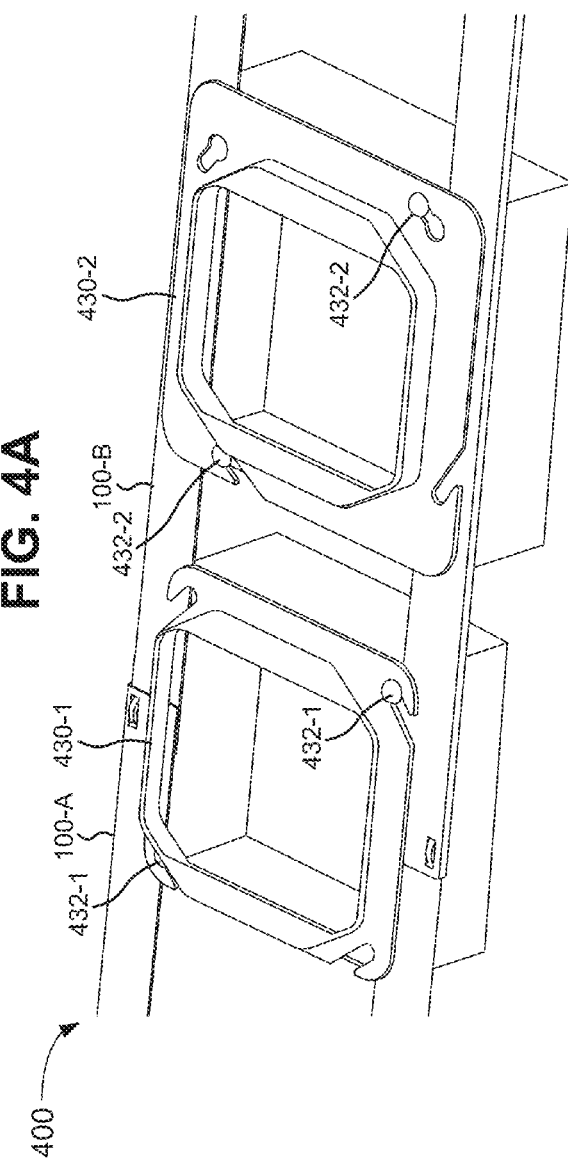

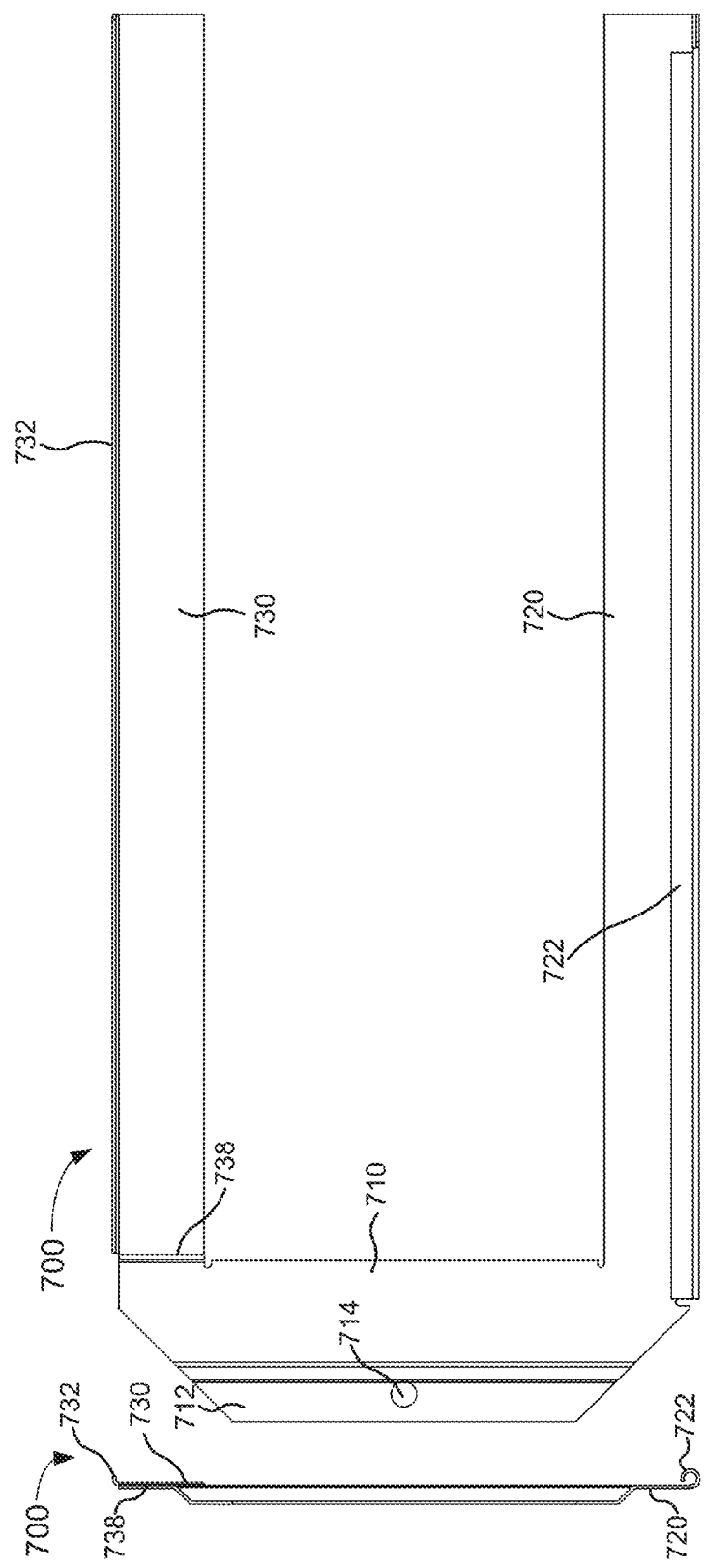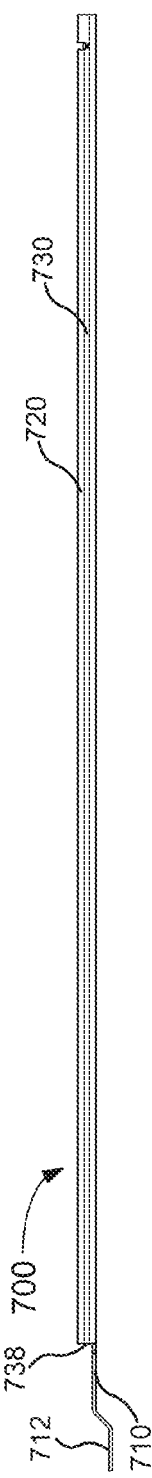

ADJUSTABLE BRACKET ASSEMBLY

CROSS-REFERENCE TO RELATED APPLICATION

This application claims priority under 35 U.S.C. §119, based on U.S. Provisional Patent Application No. 61/840,123, filed on Jun. 27, 2013, the disclosure of which is herein incorporated by reference.

BACKGROUND INFORMATION

Electrical boxes may be used to house electrical outlets, electrical connections, light switches, and/or other types of electrical equipment. In order to hide these boxes from sight, the electrical boxes may be mounted behind the plaster of a wall to a stud, support post, or another type of structure. However, an electrical box may need to be mounted at a location away from a wall stud or another type of support structure.

BRIEF DESCRIPTION OF THE DRAWINGS

FIGS. 2A-2C are diagrams illustrating orthographic views of a bracket according to an implementation described herein;

FIGS. 4A-4B are diagrams of the adjustable bracket assembly with installed electrical boxes according to an implementation described herein;

FIGS. 7A-7C are diagrams illustrating orthographic views of a bracket according to another implementation described herein;

DETAILED DESCRIPTION OF PREFERRED EMBODIMENTS

Figure 1:
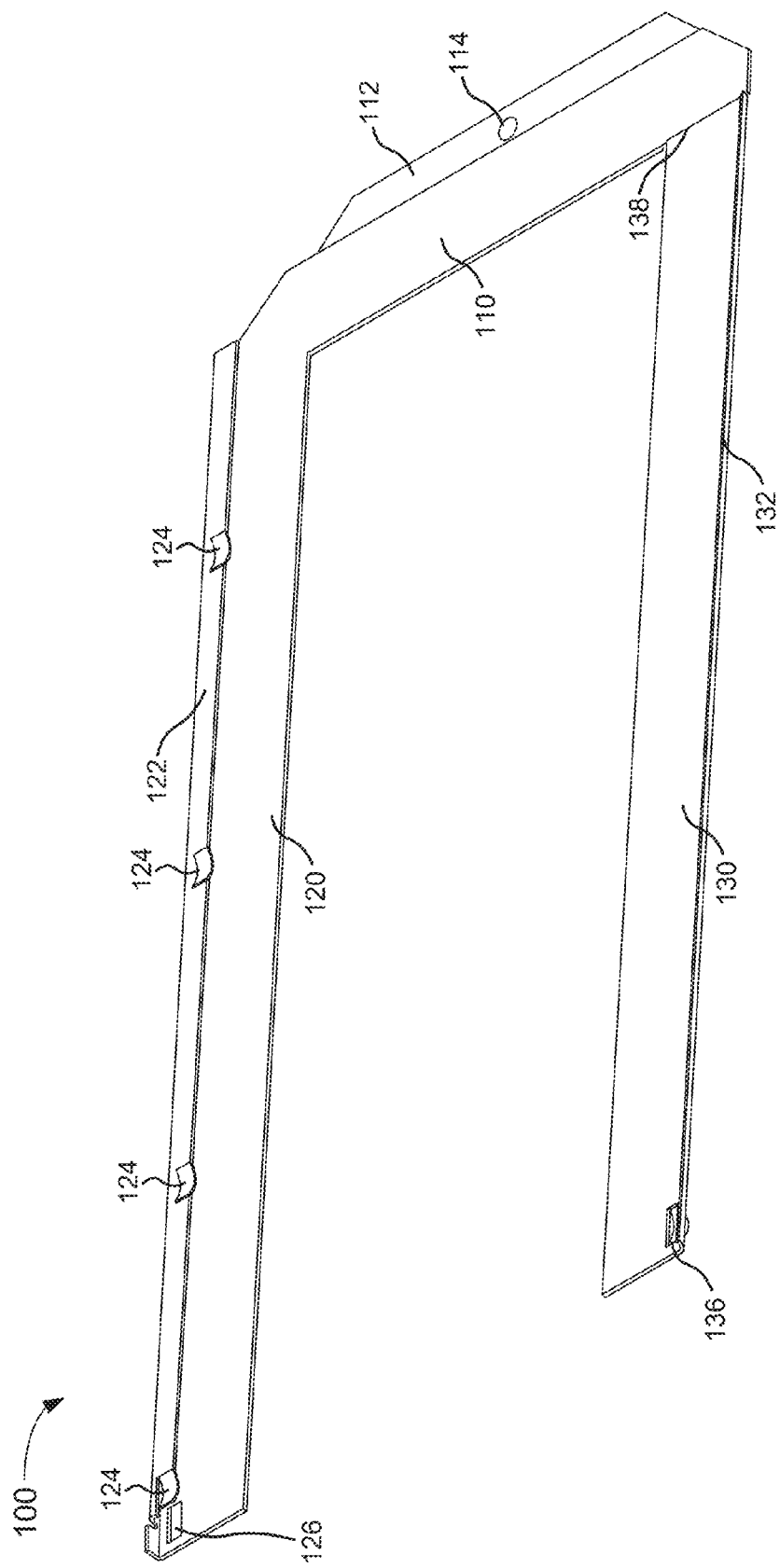
FIG. 1 is a diagram illustrating an isometric view of a bracket according to an implementation described herein.

The following detailed description refers to the accompanying drawings. The same reference numbers in different drawings identify the same or similar elements.

Implementations described herein relate to a bracket and an adjustable bracket assembly. The adjustable bracket assembly may include two substantially identical hermaphroditic brackets that fit together and are configured to slide to adjust the width of the bracket assembly. The adjustable bracket assembly may include a first hermaphroditic piece and a second hermaphroditic piece, substantially identical to the first hermaphroditic piece and rotated 180 degrees with respect to the first hermaphroditic piece, wherein sliding the first hermaphroditic piece with respect to the second hermaphroditic piece adjusts a width of the adjustable bracket. The term "hermaphroditic piece" may refer to a first bracket piece that includes a male connection and a female connection with respect to a second bracket piece, such that the male connection of the first bracket piece fits inside the female connection of the second bracket piece and the male connection of the second bracket piece fits inside the female connection of the first bracket piece.

Each bracket may include a mounting base and two legs that together form a U shape. One of the legs may be non-elevated or co-planar with respect to the plane of the mounting base and the other one of the legs may be elevated with respect to the plane of the mounting base. Furthermore, each of the legs may include a rail on an outside edge. The shape of a first rail on a first leg and the shape of a second rail on a second leg may be shaped so that when two brackets are aligned as slid together into a bracket assembly, one of the rails fits into, and is trapped by, the other one of the rails to prevent the bracket assembly from coming apart when a load is applied. For example, the non-elevated leg may include a U shaped rail and the elevated leg may include an L shaped rail. When a first bracket is aligned with a second bracket, the second bracket being turned 180 degrees with respect to the first bracket, the L shaped rail of the elevated leg of the first bracket may align with, and slide within, the U shaped rail of the non-elevated leg of the second bracket and the L shaped rail of the elevated leg of the second bracket may align with, and slide within, the U shaped rail of the non-elevated leg of the first bracket to form the bracket assembly. Sliding the L shaped rails within the U shaped rails may adjust the width of the bracket assembly and may enable the bracket assembly to be mounted between two wall studs that are various distances apart. Furthermore, the rails may prevent the bracket assembly from bending up or down. The height of the bracket assembly, determined by the space between the two legs of each bracket, may correspond to a distance of a particular type of electrical box, enabling the particular type of electrical box to be mounted within the bracket assembly.

Furthermore, the bracket may include additional features to enable the two brackets of a bracket assembly to fit securely together. For example, the non-elevated leg of a bracket may include a slot at a particular distance from the end and the elevated leg of the bracket may include a retaining tab at the particular distance from the end. The retaining tab may be pressed out to a rounded shape to fit the slot. Thus, when a first bracket is aligned with a second bracket and the bracket assembly is adjusted to a maximum width, the retaining tab of the elevated leg of the first bracket may fit and/or snap into the slot of the non-elevated leg of the second bracket, and the retaining tab of the elevated leg of the second bracket may fit and/or snap into the slot of the non-elevated leg of the first bracket, securing the two brackets together.

Additionally, the U shaped rail of the non-elevated leg may include a set of tabs that press into the elevated leg of the other bracket, when the two brackets are fitted together. The set of tabs may increase the friction between the non-elevated leg of one bracket and the elevated leg of the other bracket, maintaining a particular width of the bracket assembly as the bracket assembly is positioned into place during installation. Furthermore, these functions may maintain sturdiness of the assembly and prevent the bracket assembly from bending up or down.

A bracket assembly that includes two identical brackets may simplify manufacture and/or installation. Manufacture of only one type of bracket, rather than of two different types of brackets that fit together, may require only one manufacturing process. Furthermore, during installation, a worker need not look for two different brackets that fit together, but may rather pick up two brackets from a box of brackets and slide the two brackets together. Moreover, manufacture of a bracket according to the implementations described herein may reduce cost by reducing scrap metal. For example, the bracket may be manufactured by, for example, being stamped out of sheet metal. The shape of the bracket may be stamped out of a single piece of sheet metal and may not require welding or fastening of additional pieces of metal.

Another implementation described herein relates to a bracket that may result in further simplifying the manufacturing process and that may result in further reductions in scrap material. A strip of material, such as a strip of sheet metal, may be cut out bent at right angles to form the two legs of the bracket. One leg may be bent at a right angle over the mounting base and the other leg may be bent at a right angle under or over the mounting base to form a U shaped bracket. A U shaped rail may be bent into shape along an outside edge of one of the legs. For example, the bent-over leg may include the U shaped rail. When a first bracket is aligned with a second bracket with the second bracket being turned 180 degrees with respect to the first bracket, the bent-over leg of the first bracket may align with the bent-under leg of the second bracket and the bent-under leg of the second bracket may slide within the U shaped rail of the bent-over leg of the first bracket. Furthermore, the bent-over leg of the second bracket may align with the bent-under leg of the first bracket and the bent-under leg of the first bracket may slide within the U shaped rail of the bent-over leg of the second bracket.

Yet another implementation described herein relates to a bracket with a non-elevated leg that includes a circularly shaped rail (e.g., circular in cross-section) and an elevated leg that includes an L-shaped rail. When a first bracket is aligned with a second bracket, the second bracket being turned 180 degrees with respect to the first bracket, the L shaped rail of the elevated leg of the first bracket may align with, and slide within, the circularly shaped rail of the non-elevated leg of the second bracket and the L shaped rail of the elevated leg of the second bracket may align with, and slide within, the circularly shaped rail of the non-elevated leg of the first bracket to form the bracket assembly.

FIG. 1 is a diagram illustrating an isometric view of a bracket 100 according to an implementation described herein. Bracket 100 may be manufactured from a metal material, such as sheet metal. For example, in some implementations, bracket 100 may be manufactured from 23 gauge galvanized steel. In other implementations, bracket 100 may be manufactured from another type of metal material, such as aluminum. As shown in FIG. 1, bracket 100 may include a mounting base 110, a non-elevated leg 120, and an elevated leg 130.

Mounting base 110 may include an area for mounting bracket 100 to a support, such as a wall stud. Furthermore, the length of mounting base 110 may define a height of the space between the two legs and may determine a dimension of an electrical box that may be mounted in a bracket assembly composed of two brackets 100.

Mounting base 110 may include a mounting area 112. Mounting area 112 may abut a wall stud, or another type of support structure, when bracket 100 is installed. Mounting area 112 may include a fastener hole 114. While a single fastener hole 114 is shown in FIG. 1, in another implementation, bracket 100 may include multiple fastener holes 114. Edge of mounting area 112 may prevent a twisting action and provide a means to keep the bracket aligned with a wall stud or with another type of support structure.

Non-elevated leg 120 may extend from one end of mounting base 110 in the same plane (e.g., is co-planar) as mounting base 110 and may form a substantially right angle with mounting base 110. Non-elevated leg 120 may include a U shaped rail 122 and a slot 126. U shaped rail 122 may extend along an outside edge of non-elevated leg 120 along approximately the entirety of the length of non-elevated leg 120, but not reach all the way to the end of non-elevated leg 122 and may end before slot 126. U shaped rail 122 may be formed by bending the outside edge of non-elevated leg 120 into a U shape.

U shaped rail 122 may include a set of tabs 124 (referred to herein collectively as "tabs 124" and individually as "tab 124"). Tabs 124 may be spaced at particular intervals along the length of U shaped rail 122 as shown in FIG. 1. Tabs 124 may be, for example, stamped into leg 120 either before or after U shaped rail 122 is bent into place. Tabs 124 may function to increase friction between non-elevated leg 120 of a first bracket and elevated leg 130 of a second bracket when the two brackets are slid into each other. Thus, tabs 124 may function to keep a bracket assembly at a particular width as the bracket assembly is positioned into place and installed between two wall studs. Tabs 124 may maintain sturdiness of the assembly and may prevent the bracket assembly from bending up or down. Slot 126 may be positioned near the end of non-elevated leg 120 at a particular distance from the end.

Elevated leg 130 may extend from the other end of mounting base 110 in a plane parallel to the plane of mounting base 110 and elevated above the plane of mounting base 110 by about the thickness of the material from which bracket 100 is made. Non-elevated leg 120 and elevated leg 130 may be of substantially equal length. Elevation of elevated leg 130 by about the thickness of bracket 100 above the plane of mounting bracket 100 and non-elevated leg 120 may enable alignment of elevated leg 130 of a first bracket 100 with non-elevated leg 120 of a second bracket 100 when the two brackets are slid into each other. Elevated leg 130 may, be elevated by, for example, performing a stamping operation on bracket 100.

Elevated leg 130 may include an L shaped or U shaped rail 132, a retaining tab 136, and elevation bend 138. L or U shaped rail 132 may extend along an outside edge of elevated leg 130 along approximately the entirety of the length of elevated leg 130. L or U shaped rail 132 may be formed by bending the outside edge of elevated leg 130 into an L or U shape. The height of L or U shaped rail 132 may be set so that L or U shaped rail 132 slides into U shaped rail 122 of another bracket 100.

Retaining tab 136 may be positioned near the end of elevated leg 130 at a particular distance from the end, corresponding to the distance that slot 126 is position from the end of non-elevated leg 120. Retaining tab 136 may be stamped, or otherwise formed, from the material of elevated leg 130. The length and width of retaining tab 136 may correspond to the length and width of slot 1126 and the position of retaining tab 136 on elevated leg 130 may correspond to the position of slot 126 on non-elevated leg 120 so that when a first bracket 100 is aligned with a second bracket 100 and the bracket assembly formed from the two brackets is extended to a maximum width, retaining tabs 136 fit and/or snap into slots 126 to secure the two brackets to each other.

Elevation bend 138 may offset elevated leg 130 above a plane of mounting base 110 and non-elevated leg 120 by about the thickness of the material from which bracket 100 is made. As explained above, elevation bend 138 may be generated when elevated leg 130 is stamped or otherwise processed to become elevated with respect to mounting base 110 and non-elevated leg 120.

Bracket 100 may correspond to a hermaphroditic bracket piece as L shaped rail 132 of elevated leg 130 of a first bracket 100 may correspond to a male connection that fits into U shaped rail 122 of non-elevated leg 120 of a second bracket 100 and U shaped rail 122 of non-elevated leg 120 of the first bracket 100 may correspond to a female connection into which fits the L shaped rail 132 of elevated leg 130 of the second bracket 100.

FIGS. 2A-2C are diagrams illustrating orthographic views of bracket 100 according to an implementation described herein. FIG. 2A is an edge on view of bracket 100. FIG. 2A shows the shape of U shaped rail 122 of non-elevated leg 120 and the shape of L shaped rail 132 of elevated leg 130. In other implementations, L shaped rail 132 may have a U shape that fits inside U shaped rail 122. While not drawn to scale, FIG. 2A shows the relative heights of U shaped rail 122 and L shaped rail 132 with respect to each other and with respect to the thickness of bracket 100 in accordance with an implementation. For example, bracket 100 may exhibit a relatively flat profile with a height of L-shaped rail 132 being less than three times the thickness of elevated leg 130 and with a height of U-shaped rail 122 less than three times the thickness of elevated leg 130 and configured to fit over L shaped rail 132 when two brackets 100 are slid into each other. FIG. 2A further shows that elevated leg 130 may be elevated above the plane of mounting base 110 and non-elevated leg 120 by about the thickness of the material from which bracket 100 is made.

FIG. 2B is a top view of bracket 100. Among other things, FIG. 2B illustrates the overall shape of bracket 100, the alignment of slot 126 and retaining tab 136 with respect to each other, as well as the position of tabs 124. FIG. 2C is a side view of bracket 100. FIG. 2C illustrates an implementation of the shape of mounting area 112 with respect to mounting base 100, as well as the position of elevated leg 130 with respect to non-elevated leg 120 and mounting base 110.

While FIGS. 1, 2A, 2B, and 2C illustrate exemplary components of bracket 100, in other implementations, bracket 100 may include fewer components, different components, differently arranged components, or additional components than depicted in FIGS. 1, 2A, 2B, and 2C. As an example, as previously stated, bracket 100 may include multiple fastener holes 114. As another example, non-elevated leg 120 and elevated leg 130 need not form right angles with mounting base 110 but may instead form rounded corners with mounting base 110. As yet another example, U shaped rail 122 need not be U shaped and L shaped rail 132 need not be L shaped. Rather, U shaped rail 122 and L shaped rail 132 may be of any shapes that fit together to prevent two brackets 100 from coming apart when slid together to form a bracket assembly and when a load is applied. For example, U shaped rail 122 may be V shaped and L shaped rail 132 may also be V shaped. As another example, U shaped rail 122 may be C shaped and L shaped rail 132 may also be C shaped. As yet another example, slot 126 and retaining tab 136 need not be rectangular in shape, but may be of any shapes so that retaining tab 136 of one bracket 100 fits into slot 126 of another bracket 100. As yet another example, in other implementations, U shaped rail 122 may be located on elevated leg 130 and L shaped rail 132 may be located on non-elevated leg 120.

Figure 3A:
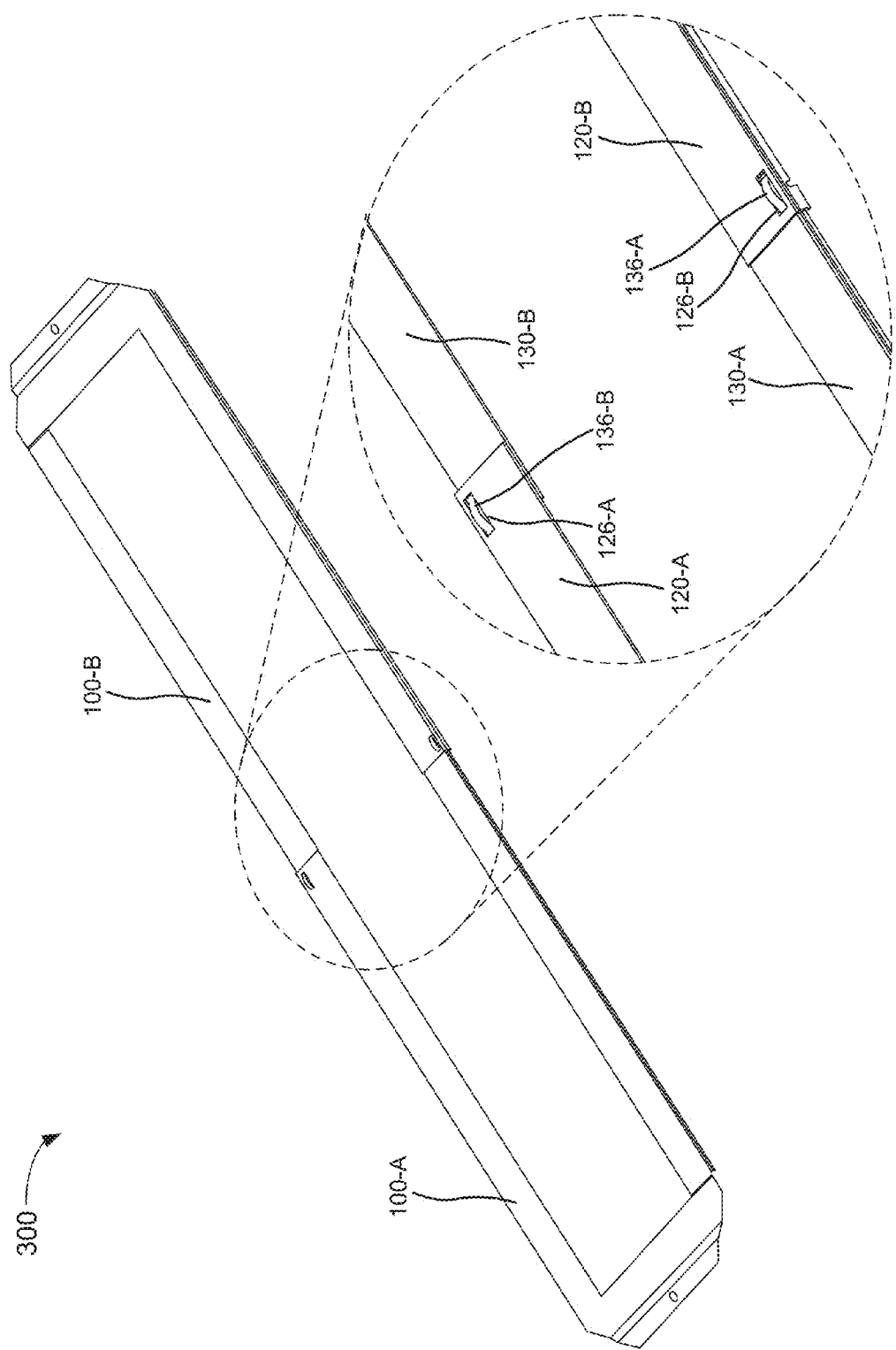
FIGS. 3A and 3B are diagrams illustrating isometric views of an adjustable bracket assembly according to an implementation described herein.
Figure 3B:
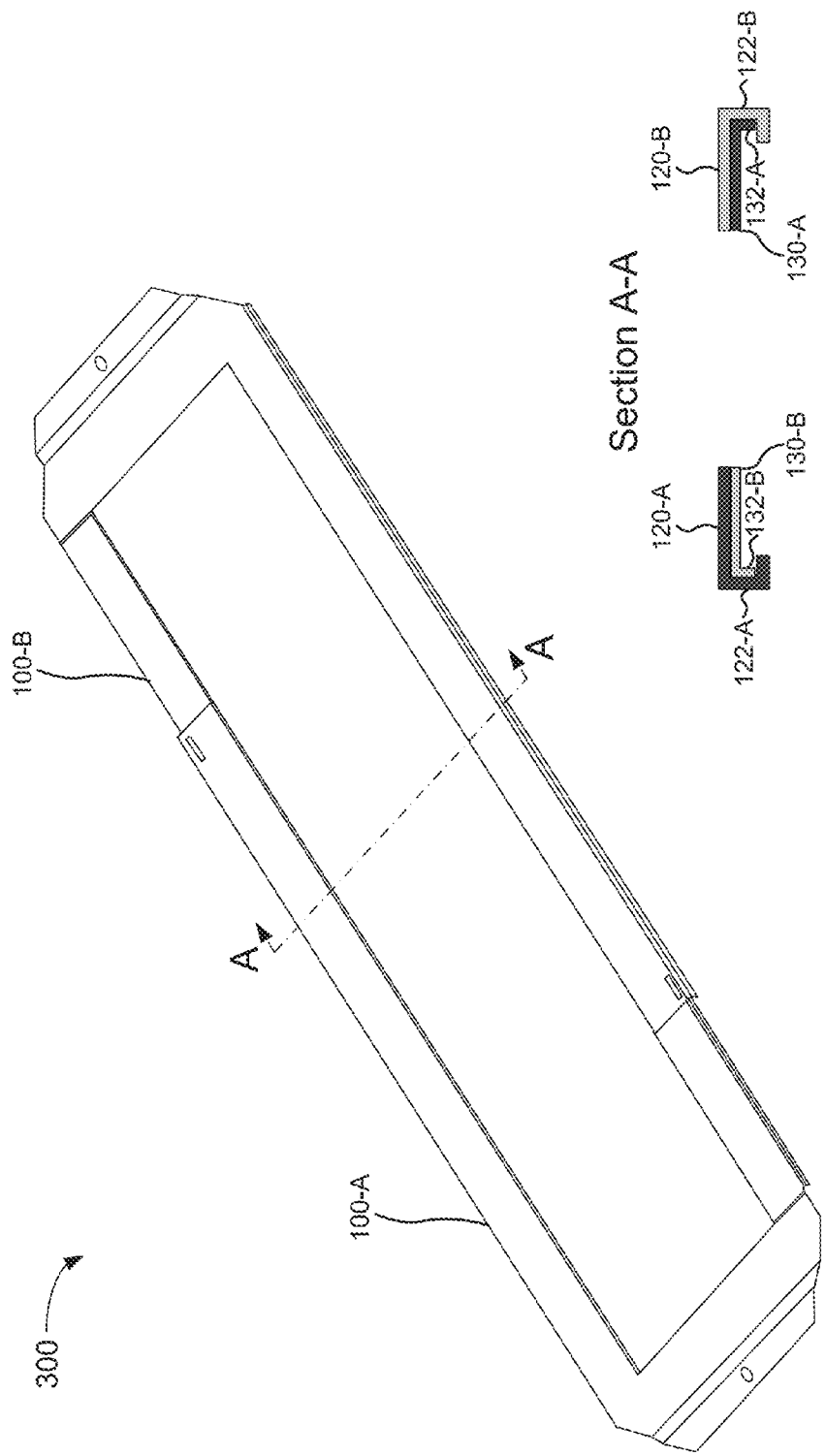

FIGS. 3A and 3B are diagrams illustrating isometric views of an adjustable bracket assembly 300 according to an implementation described herein. Bracket assembly 300 may include first bracket 100-A and second bracket 100-B. Second bracket 100-B may be rotated 180 degrees with respect to first bracket 100-A and the two brackets may slide into each other. L shaped rail 132 of elevated leg 130-A of first bracket 100-A may fit into, and slide along, U shaped rail 122 of non-elevated leg 120-B of second bracket 100-B, L shaped rail 132 of elevated leg 130-B of second bracket 100-B may fit into, and slide along, U shaped rail 122 of non-elevated leg 120-A of first bracket 100-A, thereby preventing bracket assembly 300 from coming apart when a bending or torsional load is applied. Furthermore, bracket assembly 300 provides a level surface to enable an electrical box to be mounted onto bracket assembly 300. Bracket assembly 300 may be extendable from a minimum width to a maximum width, such as, for example, from 12 inches to 25 inches, to accommodate a range of commonly encountered widths between two wall studs. In other implementations, the minimum width may be less (e.g., 6 inches or less) and/or the maximum width may be greater (e.g., 30 inches or more). Furthermore, each implementation of bracket 100 may be manufactured for a particular size of electrical boxes and may have a corresponding height (i.e., the space between non-elevated leg 120 and elevated leg 130) based on the particular size.

FIG. 3A illustrates bracket assembly 300 at full extension so that bracket assembly 300 is at the maximum width. As shown in the close-up view in FIG. 3A, at the maximum width retaining tabs 136 may fit and/or snap into slots 126. Thus, retaining tab 136-A of elevated leg 130-A of first bracket 100-A may fit and/or snap into slot 126-B of non-elevated leg 120-B of second bracket 100-B and retaining tab 136-B of elevated leg 130-B of second bracket 100-B may fit and/or snap into slot 126-A of non-elevated leg 120-A of first bracket 100-A.

FIG. 3B illustrates bracket assembly 300 at a point between the minimum width and the maximum width, such that retaining tabs 136 are no longer engaged with slots 126. Furthermore, section A-A' illustrates the cross section of bracket assembly 300 and shows how the two brackets align. As shown in the cross section of section A-A', non-elevated leg 120-A of first bracket 100-A may be aligned and flush with elevated leg 130-B of second bracket 100-B (e.g., as a result of tabs 124) and L shaped rail 132-B of elevated leg 130-B of second bracket 100-B may slide within U shaped rail 122-A of non-elevated leg 120-A of first bracket 100-A. Similarly, non-elevated leg 120-B of second bracket 100-B may be aligned and flush with elevated leg 130-A of first bracket 100-A and L shaped rail 132-A of elevated leg 130-A of first bracket 100-A may slide within U shaped rail 122-B of non-elevated leg 120-B of second bracket 100-B.

Figure 3C:
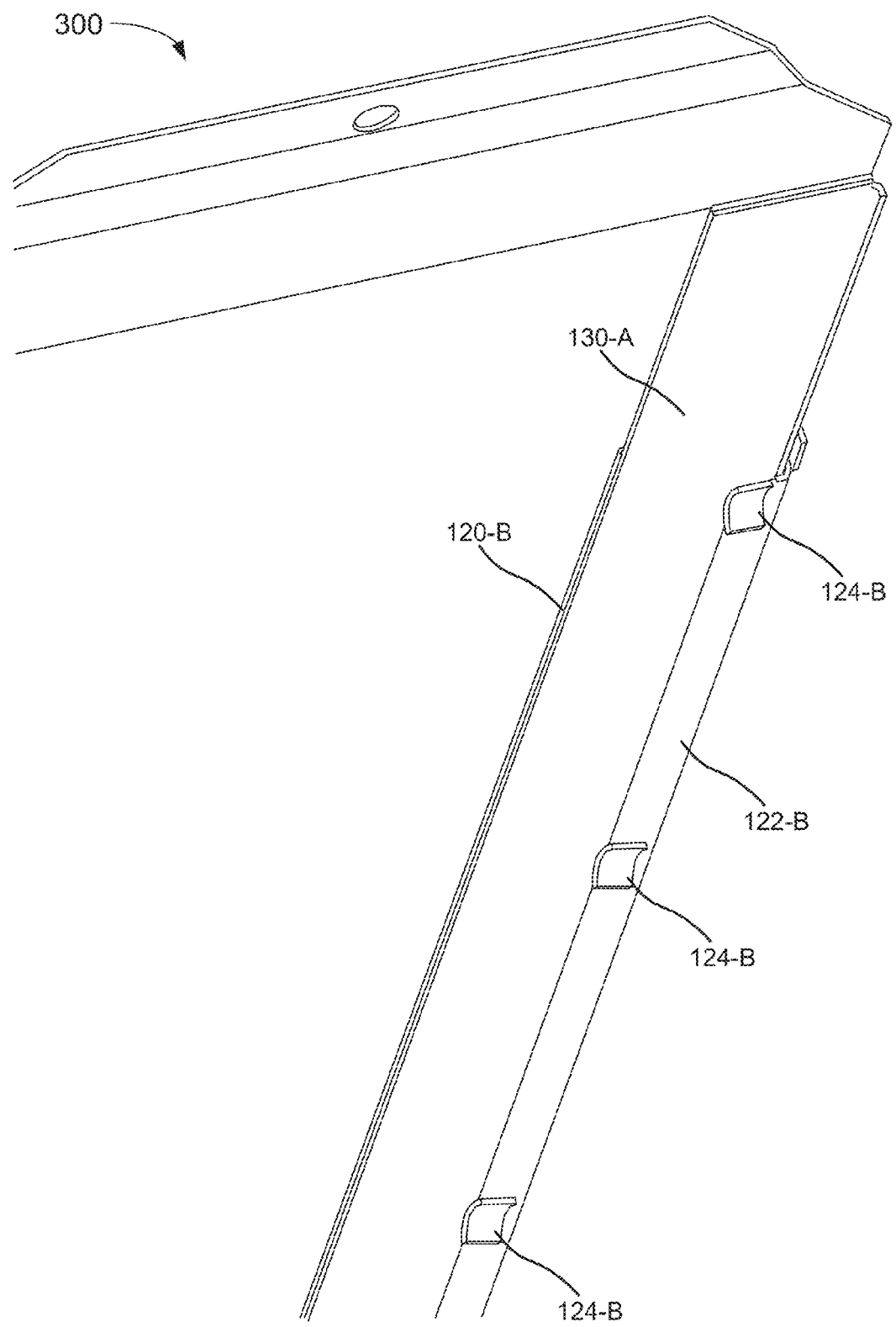
FIGS. 3C-3E are diagrams of a close-up view of rails of the adjustable bracket assembly according to an implementation described herein.
Figure 3D:
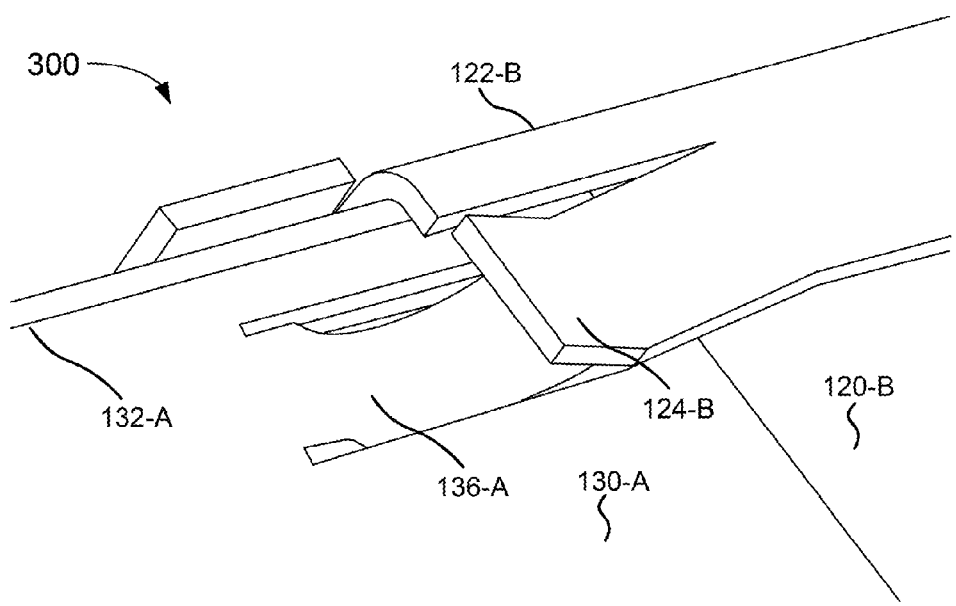
Figure 3E:
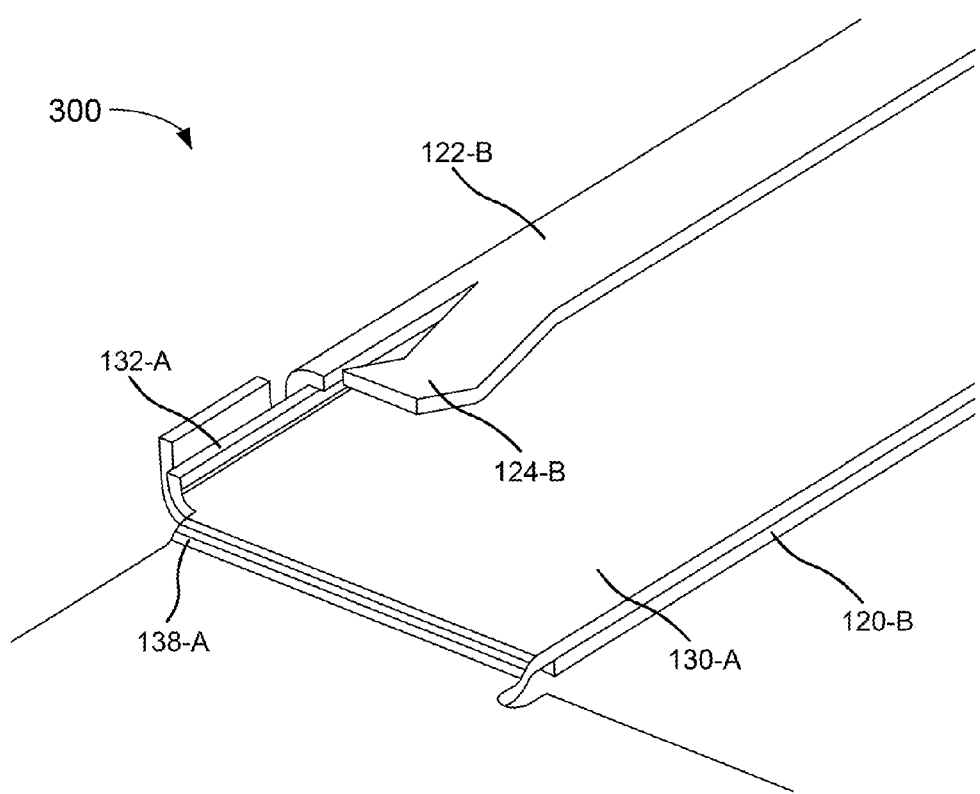

FIGS. 3C-3E are diagrams of a close-up view of the rails of the adjustable bracket assembly 300 according to an implementation described herein. FIG. 3C illustrates a view of U shaped rail 122-B of non-elevated leg 120-B of second bracket 100-B. As shown in FIG. 3C, rail 122-B may enclose elevated leg 130-A of first bracket 100-A and tabs 124-B may press against elevated leg 130-A of first bracket 100-A.

Tabs 124-B may increase friction between non-elevated leg 120-B of second bracket 100-B and elevated leg 130-A of first bracket 100-A. Similarly, tabs 124-A may increase friction between non-elevated leg 120-A of first bracket 100-A and elevated leg 130-B of second bracket 100-B (not shown in FIG. 3C). Thus, tabs 124 may help bracket assembly 300 maintain a particular width as bracket assembly is position into place and installed between two wall studs.

FIG. 3D illustrates a close up of L shaped rail 132-A sliding into U shaped rail 122-B and retaining tab 136-A engaging slot 126-B (slot 126-B is not visible in FIG. 3D). FIG. 3E illustrates bracket assembly 300 at the minimum width, when the two brackets have been slid together all the way to create bracket assembly 300 at its minimum width. As shown in FIG. 3E, non-elevated leg 120-B of second bracket 100-B may abut against elevation bend 138-A of elevated leg 130-A of first bracket 100-A. Similarly, non-elevated leg 120-A of first bracket 100-A may abut against elevation bend of elevated leg 130-B of second bracket 100-B (not shown in FIG. 3E). Lead in tab 124-B may help to lead bracket 130-A and may help to slide the two brackets into each other.

FIGS. 4A-4B are diagrams of a system 400 that includes adjustable bracket assembly 300 with installed electrical boxes according to an implementation described herein. As shown in FIG. 4A, system 400 may include a first wall stud 410-A, a second wall stud 410-B, first bracket 100-A, second bracket 100-B, and one or more electrical boxes. Two electrical boxes 430-1 and 430-2 are shown in FIGS. 4A and 4B for illustrative purposes, but a different number of electrical boxes may be included in system 400.

First bracket 100-A may be mounted to first wan stud 410-A through fastener hole 114 using screw 420-A and second bracket 100-B may be mounted to second wall stud 410-B through fastener hole 114 using screw 420-B. The width of bracket assembly 300 may be adjusted by sliding first bracket 100-A and second bracket 100-B to fit between first wall stud 410-A and second wall stud 410-B. Electrical boxes 430-1 and 430-2 may be mounted into the space between the legs of first bracket 100-A and second bracket 100-B.

FIG. 4B illustrates a close-up view of system 400. As shown in FIG. 4B, electrical box 430-1 may be mounted to bracket assembly 300 using screws 432-1 and electrical box 430-2 may be mounted to bracket assembly 300 using screws 432-2.

Figure 4C:
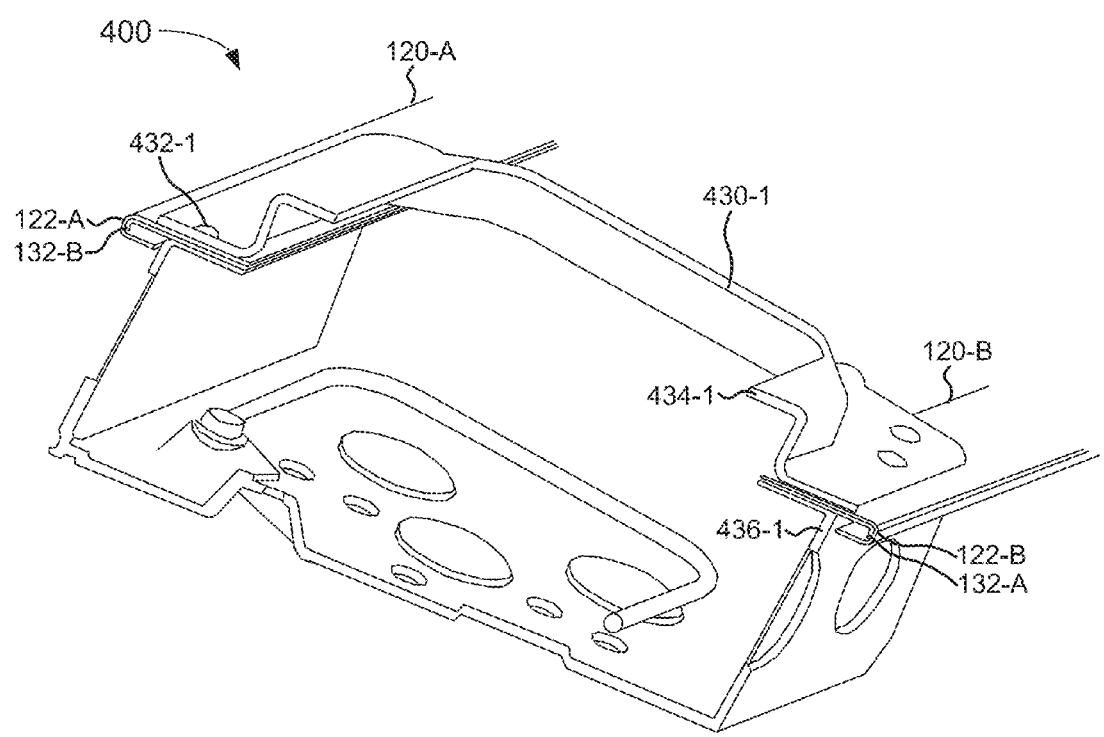
FIG. 4C is a diagram of a cross section of the adjustable bracket assembly with an installed electrical box according to an implementation described herein.

FIG. 4C is a diagram of a cross section of part of system 400, which includes the adjustable bracket assembly 300 with an installed electrical box, according to an implementation described herein. As shown in FIG. 4C, electrical box 430-1 may include a cover 434-1 and a body 436-1. Cover 434-1 may be flanged to fit over the legs of first bracket 100-A and second bracket 100-B. Thus, to install electrical box 430-1 to bracket assembly 300, cover 434-1 may be removed and bracket assembly 300 may be placed between mud ring 434-1 and body 436-1 and screws 432-1 may be tightened, resulting in bracket assembly 300 being sandwiched between mud ring 434-1 and body 436-1. The dimensions of brackets 100 may be configured so that U shaped rail 132 may abut against body 436-1 when electrical box 432-1 is mounted, further securing electrical box 432-1 in place.

Figure 5A:
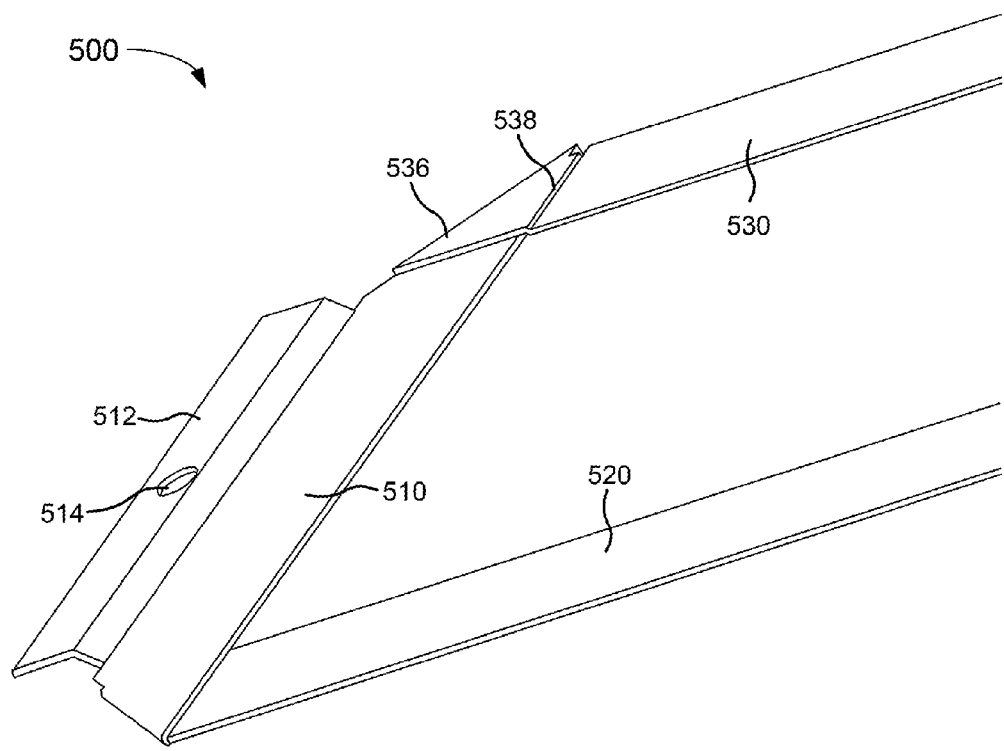
FIGS. 5A and 5B are diagrams illustrating isometric views of another implementation of a bracket according to an implementation described herein.
Figure 5B:
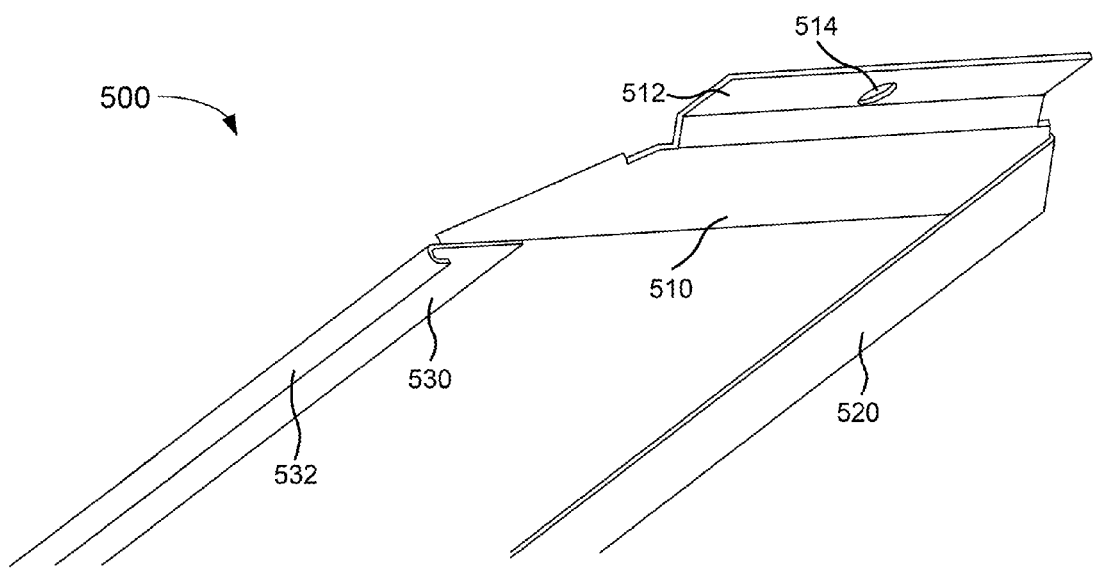

FIGS. 5A and 5B are diagrams illustrating isometric views of another implementation of a bracket 500 according to an implementation described herein. Bracket 500 may be manufactured from a single strip of material. Bracket 500 may be manufactured from a metal material, such as a stock of sheet metal. For example, in some implementations, bracket 500 may be manufactured from 24 gauge galvanized steel. In other implementations, bracket 500 may be manufactured from another type of metal material, such as aluminum. Manufacture of bracket 500 may result in further simplifying the manufacturing process and may result in further reductions in scrap material. For example, cutting the shape of bracket 500 from a stock of sheet metal may minimize the amount of scrap material that is generated.

FIG. 5A shows a top view of bracket 500 and FIG. 5B shows a bottom view of bracket 500. As shown in FIGS. 5A and 5B, bracket 500 may include a mounting base 510, a bent-under leg 520, and a bent-over leg 530.

Mounting base 510 may include an area for mounting bracket 500 to a support, such as a wall stud. Furthermore, the length of mounting base 510 may define a height of the space between the two legs and may determine a dimension of an electrical box that may be mounted in a bracket assembly composed of two brackets 500. Mounting base 510 may include a mounting area 512. Mounting area 512 may abut a wall stud, or another type of support structure, when bracket 500 is installed. Mounting area 512 may include a fastener hole 514. While a single fastener hole 514 is shown in FIGS. 5A and 5B, in another implementation, bracket 500 may include multiple fastener holes 514.

Bent-under leg 520 may be made by bending the strip of material under mounting base 510 at a right angle to mounting base 510 at a first end of mounting base 510. Thus, a right angle bend 526 may exist between mounting base 510 and bent-under leg 520. Bent-under leg 520 may include a slot similar to slot 126 of bracket 100 (not shown in FIGS. 5A and 5B).

Bent-over leg 530 may be made by bending the strip of material over mounting base 510 at a right angle to mounting base 510 at a second end of mounting base 510. Thus, a right angle bend 536 may exist between mounting base 510 and bent-over leg 530. Furthermore, bent-over leg 530 may be pressed down to a same plane as mounting base 510, so that bent-over leg 530 and bent-under leg 520 are in planes that are distanced apart by about the thickness of the strip of material from which bracket 500 is made, in order for bent-over leg 530 and bent-under leg 520 to align when two brackets 500 are slid into each other. Thus, bent-over leg 530 may include a crease 538 where bent-over leg 530 meets the edge of mounting base 510. Bent-over leg 530 may include a retaining tab similar to retaining tab 136 of bracket 100 (not shown in FIGS. 5A and 5B). Bent-over leg 530 may include U shaped rail 532. When two brackets 500 are aligned, bent-under leg 520 of the first bracket 500 may fit into, and/or slide within U shaped rail 532 of bent-over leg 530 of the second bracket 500.

Bracket 500 may correspond to a hermaphroditic bracket piece as the outside edge of bent-under leg 520 of a first bracket 500 may correspond to a male connection that fits into U shaped rail 532 of bent-over leg 530 of a second bracket 500 and U shaped rail 532 of bent-over leg 530 of the first bracket 500 may correspond to a female connection into which fits the outside edge of bent-under leg 520 of the second bracket 500.

While FIGS. 5A and 5B illustrate exemplary components of bracket 500, in other implementations, bracket 500 may include fewer components, different components, differently arranged components, or additional components than depicted in FIGS. 5A and 5B. As an example, U shaped rail 532 may include a set of tabs similar to tabs 124 of bracket 100. As another example, bent-under leg 520 may include an L shaped rail similar to L shaped rail 132 of bracket 100.

Figure 6:
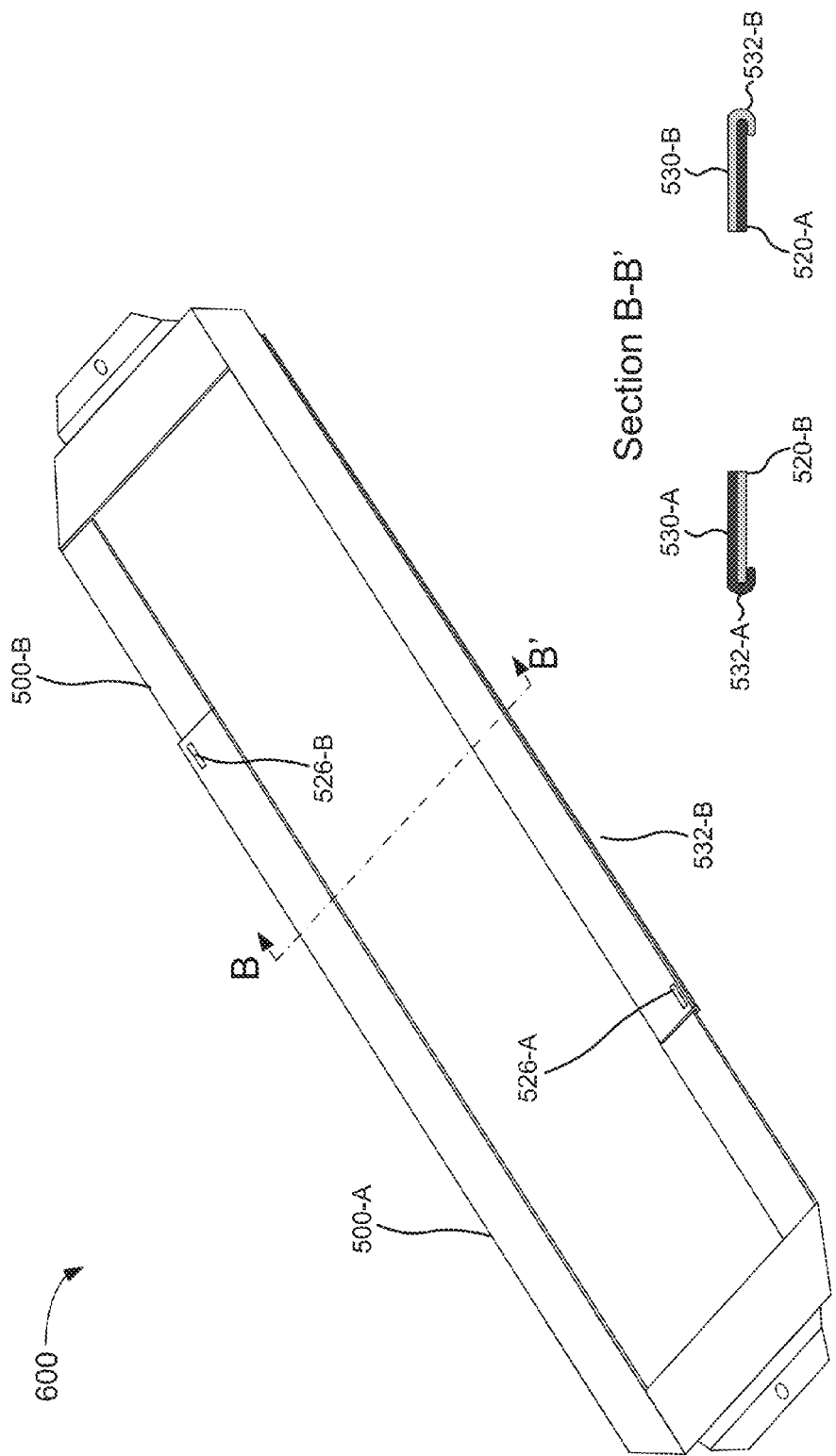
FIG. 6 is a diagram illustrating an isometric view of an adjustable bracket assembly that includes the brackets of FIGS. 5A-5B according to an implementation described herein.

FIG. 6 is a diagram illustrating an isometric view of an adjustable bracket assembly 600 that includes brackets 500 of FIGS. 5A-5B according to an implementation described herein. Bracket assembly 600 may include first bracket 500-A and second bracket 500-B. Second bracket 500-B may be rotated 180 degrees with respect to first bracket 500-A and the two brackets may slide into each other. Bracket 500-A may include slot 526-A and bracket 500-B may include slot 526-B.

Section B-B' illustrates the cross section of bracket assembly 600 and shows how the two brackets align. As shown in the cross section of section B-B', bent-under leg 520-A of first bracket 500-A may be aligned and flush with bent-over leg 530-B of second bracket 500-B and bent-under leg 520-A may slide within U shaped rail 532-B of bent-over leg 530-B of second bracket 500-B. Similarly, bent-under leg 520-B of second bracket 500-B may be aligned and flush with bent-over leg 530-A of first bracket 500-A and bent-under leg 520-B may slide within U shaped rail 532-A of bent-over leg 530-A of first bracket 500-A.

FIGS. 7A-7C are diagrams illustrating orthographic views of a bracket 700 according to another implementation described herein. In comparison with bracket 100, bracket 700 may be manufactured at a lower cost and with fewer processing steps. For example, bracket 700 may not include tabs 124, slot 126, and/or retaining tab 136. Furthermore, bracket 700 may include a first circular rail (e.g., with a circular cross-section) and a second L-shaped rail, wherein the L-shaped rail of a first bracket slides into the circular rail of a second bracket. The phrase "circular rail" as used herein may refer to a cross-section that is substantially circular or oval in shape, in the shape of a C, and/or curved without sharp angles, while retaining a space wide enough to enable the leg of another bracket to slide within the space. The circular rail may be formed out of the rail of the bracket by rolling the edge of the rail. The resulting bracket assembly may provide torsional stability that resist twisting forces on the bracket assembly.

As shown in FIGS. 7A-7C, bracket 700 may include a mounting base 710, a non-elevated leg 720, and an elevated leg 730. Mounting base 710 may include a mounting area 712. Mounting area 712 may abut a wall stud, or another type of support structure, when bracket 700 is installed. Mounting area 712 may include a fastener hole 714. While a single fastener hole 714 is shown in FIG. 7B, in another implementation, bracket 700 may include multiple fastener holes 714. The edge of mounting area 712 may prevent a twisting action and provide a means to keep bracket 700 aligned with a wall stud or with another type of support structure.

Non-elevated leg 720 may extend from one end of mounting base 710 in the same plane (e.g., is co-planar) as mounting base 710 and may form a substantially right angle with mounting base 710. Non-elevated leg 720 may include a circularly shaped rail 722 (e.g., a rail with a circular cross-section). Circularly shaped rail 722 may extend along an outside edge of non-elevated leg 720 along approximately the entirety of the length of non-elevated leg 720, but not reach all the way to the end of non-elevated leg 722. Circularly shaped rail 722 may be formed by bending the outside edge of non-elevated leg 720 into a circular shape.

Elevated leg 730 may extend from the other end of mounting base 710 in a plane parallel to the plane of mounting base 710 and elevated above the plane of mounting base 710 by about the thickness of the material from which bracket 700 is made. Non-elevated leg 720 and elevated leg 730 may be of substantially equal length. Elevation of elevated leg 730 by about the thickness of bracket 700 above the plane of mounting bracket 700 and non-elevated leg 720 may enable alignment of elevated leg 730 of a first bracket 700 with non-elevated leg 720 of a second bracket 700 when the two brackets are slid into each other. Elevated leg 730 may be elevated by, for example, performing a stamping operation on bracket 700.

Elevated leg 730 may include an L shaped or J shaped rail 732 and elevation bend 738. L or U shaped rail 732 may extend along an outside edge of elevated leg 730 along approximately the entirety of the length of elevated leg 730. L or J shaped rail 732 may be formed by bending the outside edge of elevated leg 730 into an L or J shape. The height of L or J shaped rail 732 may be set so that L or J shaped rail 732 slides into circular shaped rail 722 of another bracket 700. Elevation bend 738 may offset elevated leg 730 above a plane of mounting base 710 and non-elevated leg 720 by about the thickness of the material from which bracket 700 is made.

FIG. 7A is an edge on view of bracket 700. FIG. 7A shows the shape of circularly shaped rail 722 of non-elevated leg 720 and the shape of L shaped rail 732 of elevated leg 730. While not drawn to scale. FIG. 7A shows the relative heights of circularly shaped rail 722 and L shaped rail 732 with respect to each other and with respect to the thickness of bracket 700 in accordance with an implementation. FIG. 7A further shows that elevated leg 730 may be elevated above the plane of mounting base 710 and non-elevated leg 720 by about the thickness of the material from which bracket 700 is made. FIG. 7B is a top view of bracket 700. FIG. 7C is a side view of bracket 700. FIG. 7C illustrates an implementation of the shape of mounting area 712 with respect to mounting base 700, as well as the position of elevated leg 730 with respect to non-elevated leg 720 and mounting base 710.

Bracket 700 may correspond to a hermaphroditic bracket piece as L shaped rail 732 of elevated leg 730 of a first bracket 700 may correspond to a male connection that fits into circularly shaped rail 722 of non-elevated leg 720 of a second bracket 700 and circularly shaped rail 722 of non-elevated leg 720 of the first bracket 700 may correspond to a female connection into which fits the L shaped rail 732 of elevated leg 730 of the second bracket 700.

While FIGS. 7A, 7B, and 7C illustrate exemplary components of bracket 700, in other implementations, bracket 700 may include fewer components, different components, differently arranged components, or additional components than depicted in FIGS. 7A, 7B, and 7C. For example, other shapes for circularly shaped rail 722 and L shaped rail 732 may be used. For example, circularly shaped rail 722 may include a polygonal shape. Any combination of cross-sectional shaped for the rails may be used as long as one rail fits inside the other rail when two brackets 700 are slid together and prevent a bracket assembly from coming apart when a load, up a particular load requirement, is applied to the bracket assembly. As another example, in other implementations, the position of the rails on the legs of bracket may be switched (e.g., circularly shaped rail 722 may be on elevated leg 730 and L shaped rail 732 may be on non-elevated leg 720).

Figure 8:
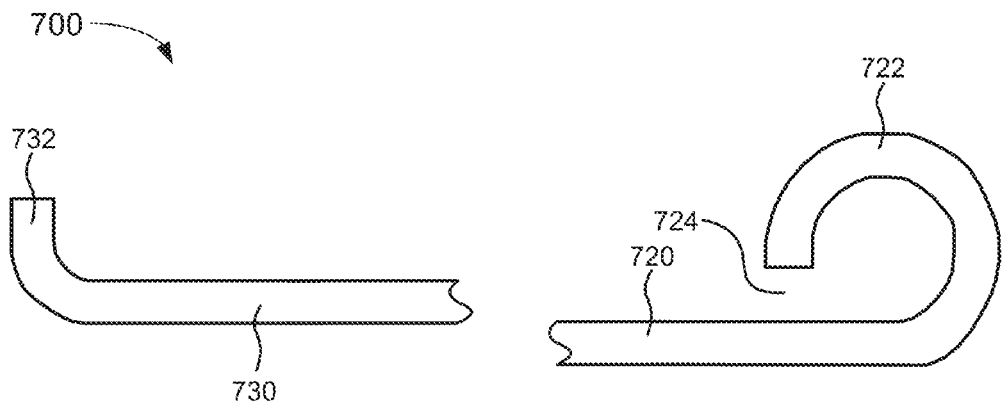
FIG. 8 is a diagram of a close-up view of rails of the adjustable bracket of FIGS. 7A-7C.

FIG. 8 is a diagram of a close-up view of rails of the adjustable bracket 700 of FIGS. 7A-7C. As shown in FIG. 8, L shaped rail 732 of elevated leg 730 is bent into a shape with an L-shaped or J-shaped cross section. Furthermore, circular rail 722 of non-elevated leg 720 has a cross section that is substantially circular or oval in shape and/or in the shape of a C, with a gap 724. Gap 724 enables elevated leg 730 of another bracket to slide inside circular rail 722. Gap 724 may thus substantially correspond to a thickness of the material of elevated leg 730 plus a clearance distance to enable elevated leg 730 of another bracket to slide inside gap 724.

Figure 9:
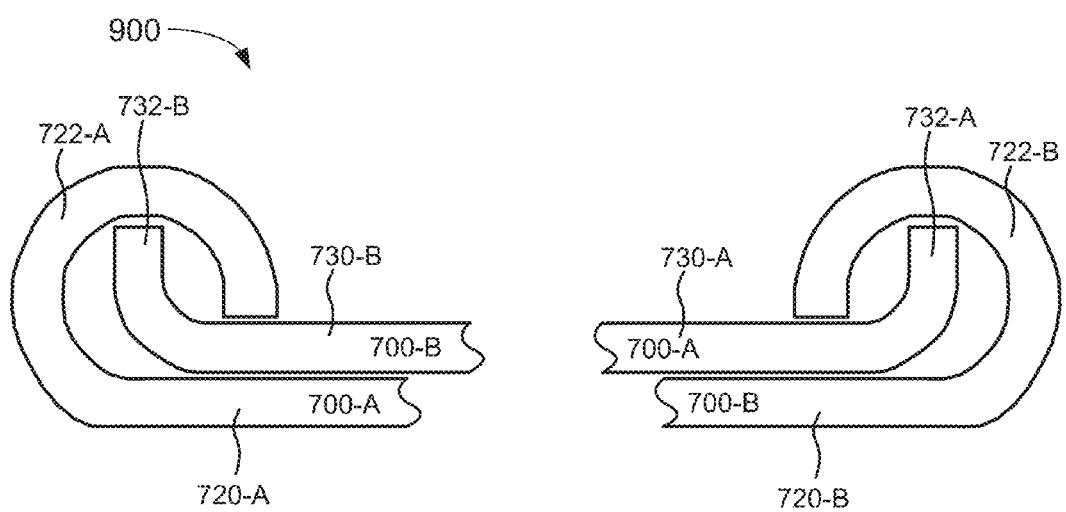
FIG. 9 is a diagram of a close-up view of the rails of an adjustable bracket assembly that includes the brackets of FIGS. 7A-7C.

FIG. 9 is a diagram of a close-up view of the rails of an adjustable bracket assembly 900 that includes the brackets of FIGS. 7A-7C. As shown in FIG. 9, circular rail 722-A of non-elevated leg 720-A of a first bracket 700-A may enclose L shaped rail 732-B of elevated leg 730-B of second bracket 700-B and circular rail 722-B of non-elevated leg 720-B of a second bracket 700-B may enclose L shaped rail. 732-A of elevated leg 730-A of first bracket 700-A.

In an exemplary implementation, bracket 700 may be about 13.52 inches long and about 5.234 inches wide, with non-elevated leg 720 being about 0.855 inches wide and 12.084 inches long, with elevated leg 730 being about 0.816 inches wide and 12.084 inches long, and with the width between the two legs being about 3.563 inches. The thickness of the material and the corresponding height of elevation bend 738 may be about 0.031 inches. The diameter of circular rail 722 may be about 0.162 inches and the height of L shaped rail 732 may be about 0.072 inches. Gap 724 may be about 0.036 inches. Mounting base 710 may be about 1.437 inches wide and mounting area 712 may be about 0.375 inches wide and about 3 inches long.

In yet another exemplary implementation, a bracket may be manufactured from a single piece of material, with a first leg folded under a mounting base a second leg folded over the mounting base, as described above with reference to FIGS. 5A and 5B, and may further include a circular rail on a first leg and an L or J shaped leg on a second rail, as described above with reference to FIGS. 7A-7C, 8, and 9.

The foregoing description of exemplary implementations provides illustration and description, but is not intended to be exhaustive or to limit the embodiments described herein to the precise form disclosed. Modifications and variations may be made in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Furthermore, for the purposes of describing and defining the present invention, a value or a range of values preceded by the terms "about" or "approximately" may encompass a range of values that includes a variation of up to 10% above and/or up to 10% below the stated value or the bounds of the stated range of values.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. An adjustable bracket, comprising:
   a first hermaphroditic piece;
   a second hermaphroditic piece, substantially identical to the first hermaphroditic piece and rotated 180 degrees with respect to the first hermaphroditic piece, wherein sliding the first hermaphroditic piece with respect to the second hermaphroditic piece adjusts a width of the adjustable bracket;
   wherein the first hermaphroditic piece and the second hermaphroditic piece both include a mounting base, an elevated leg elevated with respect to the mounting base, and a non-elevated leg extending from the mounting base in a substantially same plane as the mounting base; and
   wherein the elevated leg of the first hermaphroditic piece slides over the non-elevated leg of the second hermaphroditic piece, and wherein the elevated leg of the second hermaphroditic piece slides over the non-elevated leg of the first hermaphroditic piece.

2. The adjustable bracket of claim 1, wherein the elevated leg includes a first rail, wherein the non-elevated leg includes a second rail, wherein the first rail of the elevated leg of the first hermaphroditic piece slides within the second rail of the non-elevated leg of the second hermaphroditic piece, and wherein the first rail of the elevated leg of the second hermaphroditic piece slides within the second rail of the non-elevated leg of the first hermaphroditic piece.

3. The adjustable bracket of claim 2, wherein the first rail has a substantially L shaped cross section and wherein the second rail has a substantially U shaped cross section.

4. The adjustable bracket of claim 1, wherein the non-elevated leg includes a slot at a particular distance from an end of the non-elevated leg, wherein the elevated leg includes a retaining tab at the particular distance from an end of the elevated leg, and wherein a width and a length of the slot matches a width and a length of the retaining tab.

5. The adjustable bracket of claim 1, wherein the first rail includes a plurality of tabs bent toward an inside of the first rail.

6. A hermaphroditic bracket comprising:
   a mounting base extending in a first direction of a first plane;
   a first leg extending from a first end of the mounting base in a second direction of the first plane, the second direction being substantially perpendicular to the first direction, the first leg including:
   a first rail extending in the second direction along a side of the first leg, the first rail including a plurality of tabs bent toward an inside of the first rail; and
   a second leg extending from a second end of the mounting base in a third direction of a second plane, the third direction being parallel to the second direction and the second plane being parallel to the first plane, wherein the second plane is separated from the first plane by approximately a thickness of the first leg, and wherein the mounting base, the first leg, and the second leg form substantially a U shape, the second leg including:
   a second rail extending in the third direction along a side of the second leg.

7. The hermaphroditic bracket of claim 6, wherein the hermaphroditic bracket is configured to slide into a second hermaphroditic bracket, when the second hermaphroditic bracket is turned 180 degrees, wherein the first rail of the first leg of the hermaphroditic bracket is configured to slide along a second rail of the second leg of the second hermaphroditic bracket, and wherein the second rail of the second leg of the hermaphroditic bracket is configured to slide along a first rail of a first leg of the second hermaphroditic bracket.

8. The hermaphroditic bracket of claim 6, wherein the single piece of material includes a single piece of sheet metal.

9. The hermaphroditic bracket of claim 6, wherein the first leg includes a slot at a particular distance from an end of the first leg, wherein the second leg includes a retaining tab at the particular distance from an end of the second leg, and wherein a width and a length of the slot matches a width and a length of the retaining tab.

10. The hermaphroditic bracket of claim 6, wherein the mounting base includes one or more fastener holes.

11. A system comprising:

a first bracket; and a second bracket, substantially identical to the first bracket, wherein the first bracket is configured to slide into a rail of the second bracket, wherein the second bracket is configured to slide into a rail of the first bracket, and wherein sliding the first bracket with respect to the second bracket adjusts a width of the system;

wherein the first bracket and the second bracket both include a mounting base, an elevated leg elevated with respect to the mounting base, and a non-elevated leg extending from the mounting base in a substantially same plane as the mounting base; and wherein the elevated leg of the first bracket slides over the non-elevated leg of the second bracket, and wherein the elevated leg of the second bracket slides over the non-elevated leg of the first bracket.

* * * * *